Oct. 6, 1936.  J. L. KOUBEK  2,056,726
ASYMMETRICAL HEAD LAMP
Filed April 15, 1933      5 Sheets-Sheet 1

Inventor
John L. Koubek
By Blackmore, Spencer & Flint
Attorneys

Oct. 6, 1936.          J. L. KOUBEK          2,056,726
ASYMMETRICAL HEAD LAMP
Filed April 15, 1933          5 Sheets-Sheet 2

Inventor
John L. Koubek
By Blackmore, Spencer & Flint
Attorneys

Oct. 6, 1936.  J. L. KOUBEK  2,056,726
ASYMMETRICAL HEAD LAMP
Filed April 15, 1933   5 Sheets-Sheet 3
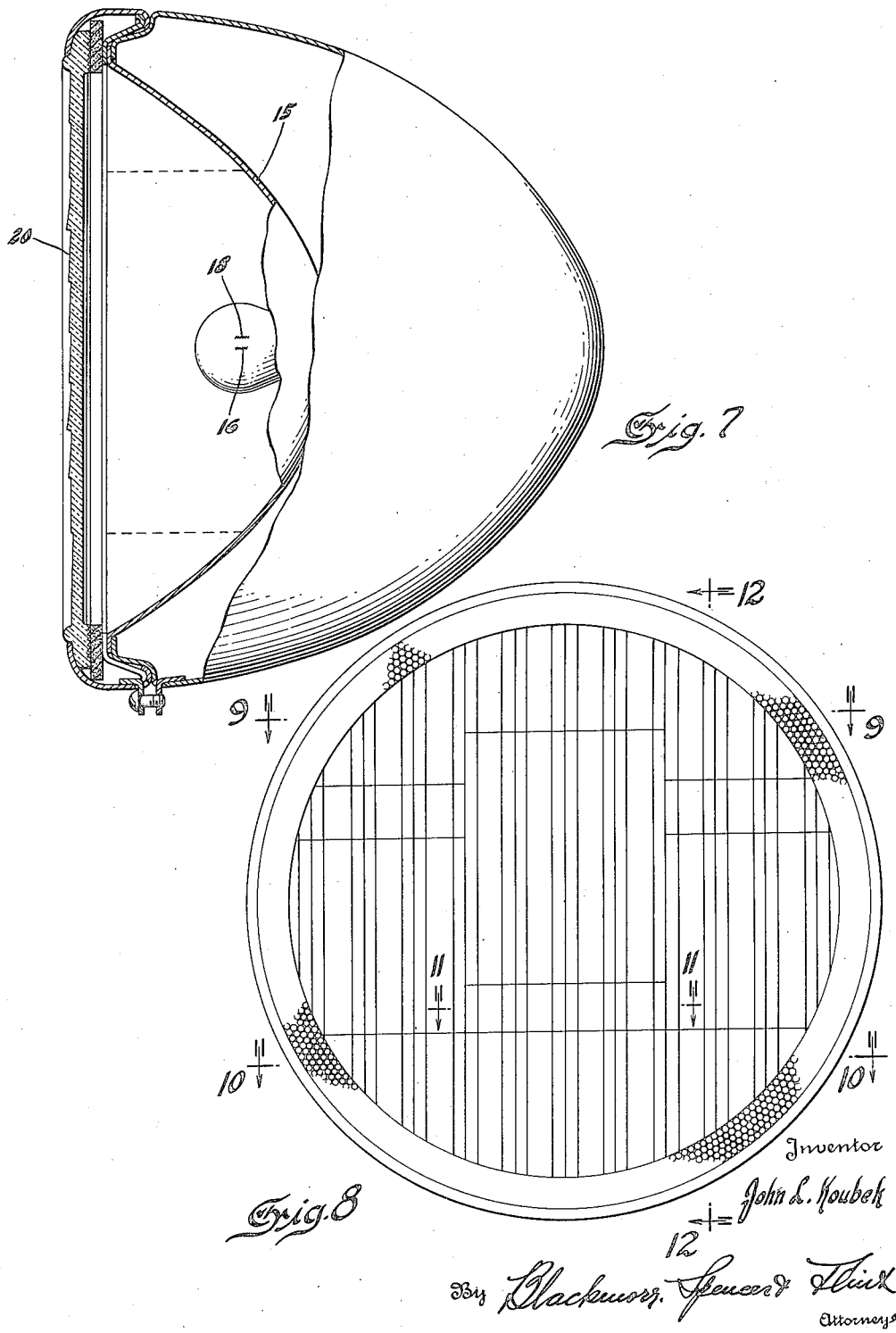

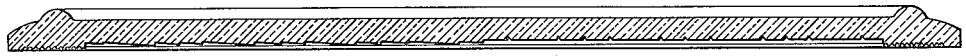
Fig. 9
Fig. 10
Fig. 11 Fig. 12
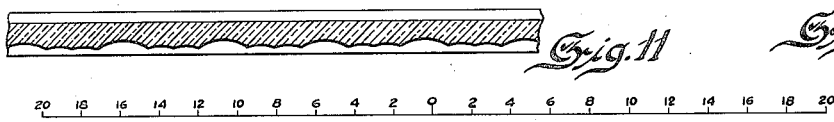
Fig. 13 TOP & BOTTOM ZONES – FILAMENT AT FOCUS
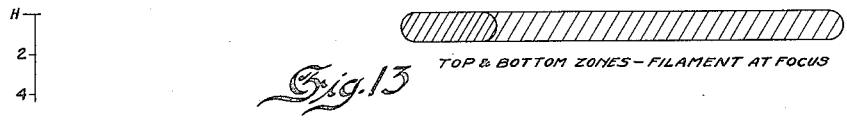
Fig. 14 TOP & BOTTOM ZONES – FILAMENT ABOVE FOCUS
Fig. 15 CENTRAL ZONE – FILAMENT AT FOCUS
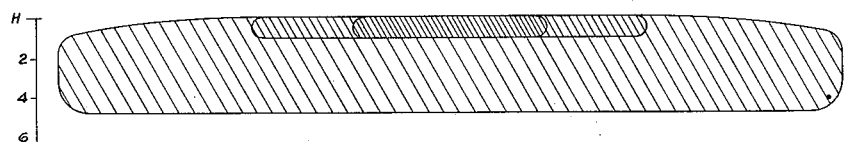
Fig. 16 CENTRAL ZONE – FILAMENT ABOVE FOCUS
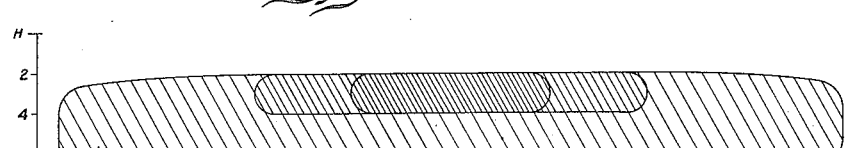
Fig. 17 COMPLETE BEAM PATTERN – FILAMENT AT FOCUS
Inventor
John L. Koubek
By Blackmorr, Spencer & Hrid
Attorneys Oct. 6, 1936.    J. L. KOUBEK    2,056,726
ASYMMETRICAL HEAD LAMP
Filed April 15, 1933    5 Sheets-Sheet 5

COMPLETE BEAM PATTERN-FILAMENT ABOVE FOCUS

Inventor
John L. Koubek
By Blackmore, Spencer & Flint
Attorneys

Patented Oct. 6, 1936

2,056,726

UNITED STATES PATENT OFFICE 2,056,726

ASYMMETRICAL HEAD LAMP

John L. Koubek, Anderson, Ind., assignor, by mesne assignments, to General Motors Corporation, Detroit, Mich., a corporation of Delaware Application April 15, 1933, Serial No. 666,240

15 Claims. (Cl. 240—41.25)

This invention has to do with headlamps for automobiles and the like. It is characterized by the fact that each of the headlamps is designed to project two beams, one of which is symmetrical, while the other is unsymmetrical in that it is higher on the right side than on the left side.

Previous lighting systems with which I am familiar, which are capable of producing symmetrical and unsymmetrical beams, have been characterized by the fact that dissimilar lamps are employed on opposite sides of the car. This prevents standardization of parts, and increases difficulty of assembly and repair. All of this is avoided by the use of my invention, for the lamps are of identical construction, and project identically the same beams.

While I have illustrated a design capable of projecting two different beams, it is obvious that by the addition of other light sources, such as, for example, a filament below focus, additional beams may be obtained if desired.

In the drawings:

Figure 1b shows the beam pattern cast by the focal filament, while

Figures 2, 2a, 2b, and 2c are a similar series of views showing the character of beams projected from the left half of the top zone of the reflector.

Figures 3, 3a, 3b, and 3c are a similar series of views showing the beams projected from the right half of the top zone.

Figures 4, 4a, 4b, and 4c are a similar series showing the beams projected by the bottom zone of a reflector.

Figures 5, 5a, 5b, and 5c are a similar series showing the character of beam projected by the left side of the bottom zone.

Figures 6, 6a, 6b, and 6c are a similar series showing the character of beam projected by the right half of the bottom zone.

Figure 7 is a vertical section through one form of headlamp embodying my invention.

Figure 8 is a rear view of the lens shown in Figure 7.

Figure 9 is a section on line 9—9 of Figure 8.

Figure 10 is a section on line 10—10 of Figure 8.

Figure 11 is a section on line 11—11 of Figure 8.

Figure 12 is a section on line 12—12 of Figure 8.

Figures 13 and 14 show the beam patterns produced by the top and bottom zones of the lamp with the filament at focus and above focus respectively.

Figures 15 and 16 are similar views of the beam patterns produced by the central zone.

Figure 18:
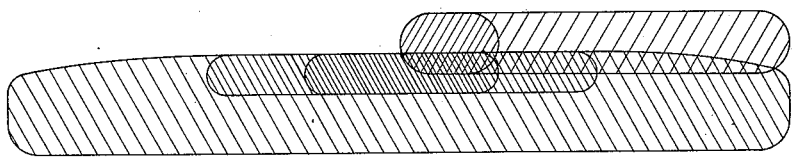

Figures 17 and 18 are similar views showing the complete beam patterns.

Figure 19:

Figure 19 is a section through the center of a modified design of lens in which the sides are provided with asymmetrical flutes spreading light from 2° to the right of the center line of 5° to the left.

Figure 20:
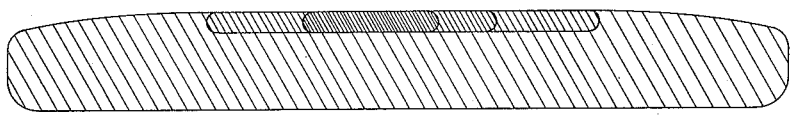
Figure 21:
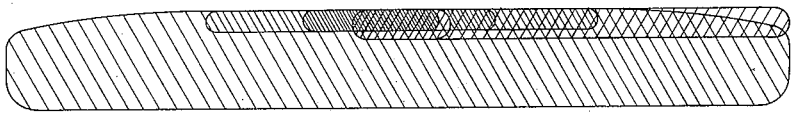

Figure 20 shows the beam pattern produced by the center zone of the lens of Figure 19, while Figure 21 shows the complete pattern cast by this design of lamp.

Present day headlamps consist of a reflector, a lens and light sources, usually in the form of filaments in a single bulb, one filament being arranged on focus and one above focus. With such an arrangement the light intercepted by the top and bottom sections of the reflector forward of the focal point is not sensitive to vertical tilt when switching from one filament to the other. This is due to the fact that the angle of the incident ray from either filament is substantially the same on the above mentioned portions of the reflector. Therefore the direction of the beam from the top and bottom sections does not change materially with either filament.

If the reflector has considerable surface forward of the focal plane, then the angle of the incident ray from the upper filament on the top section will gradually increase toward the outside of the reflector, and the angle from the same filament on the bottom section will decrease, with the result that the beam from these sections will be reflected upward from the beam that is produced by the filament at focus. However, in the average commercial reflector used today, the diameter and focal length are of such proportions that the resulting beam from the top and bottom sections forward of the focal plane, when the upper filament is burning, is substantially parallel to the resulting beam from the same section with the filament at focus.

The above principle will apply to all types of reflectors that are so designed that the impinging ray will have substantially the same angle of incidence from either filament on a common point of the reflector.

In order to produce a drop in the beam upon going from the filament on focus to the filament above focus, it is essential that the top and bottom zones of the lamp should be treated to throw light toward the bottom of the beam. This is necessary because the light from the top and bottom zones is practically unaffected as to its height of projection upon shifting from one filament to the other. The downward bending of the light from the top and bottom zones may be accomplished by tilting the corresponding sections of the reflector, or using prisms over the corresponding portions of the lens in known manner. The top and bottom zones here referred to are the portions of the reflector extending from the periphery to points slightly ahead of the intersection of the focal plane and the reflecting surface in a vertical plane through the reflector axis. From these points the lower limits of the zones extend in substantially horizontal lines to the opposite edges of the reflector. This design is necessary to secure a drop in the beam upon going to the upper filament because the rays striking the reflector adjacent the vertical intersection of the reflector and focal plane are unaffected by shift in vertical position of the source. With this arrangement the top of the high beam is composed of light from the central zone, and as this zone is sensitive to changes in position of the light source, upon shifting to the upper filament the projected rays are dropped, giving the low beam. To obtain insensitivity to variations in filament position, it is customary to also tilt the center of the central zone slightly downwardly so that the very top of the beam is composed of rays from the sides of the central zone. It will be obvious that with this construction it is not possible to secure an asymmetrical beam for all of the light forming the top of the beam is dropped upon going to the upper filament.

According to my invention the top right hand side of the beam is composed of light projected from the top and/or bottom zones of the lamp. The light forming the top of the left side of the high beam may be projected as usual from the central zone of the reflector, or more accurately from the sides of the central zone. Now upon going from a filament on focus to a filament above focus the top of the left hand side of the beam is depressed, producing a passing beam higher on the right side than on the left side.

My design of headlamps involves certain further refinements and to make these clear, it will be best to refer to the series of figures, the first ones of which are numbered 1 to 6, which set forth optical characteristics of the reflector that determine the design.

Figure 1C:
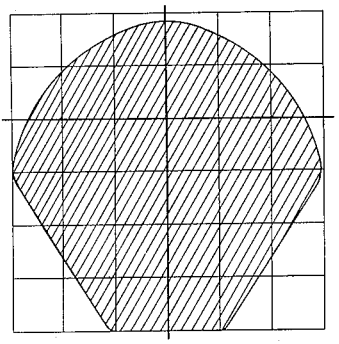
Figure 1c shows the pattern cast by the filament above focus.
Figure 2C:
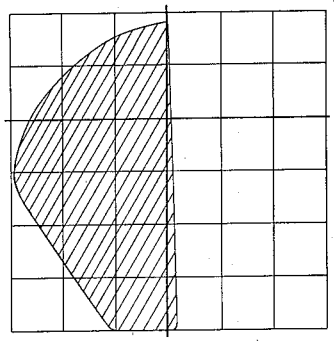
Figure 1B:
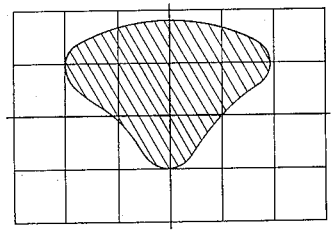
Figure 2B:
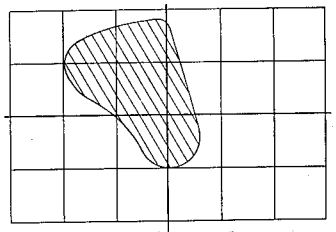
Figure 1A:
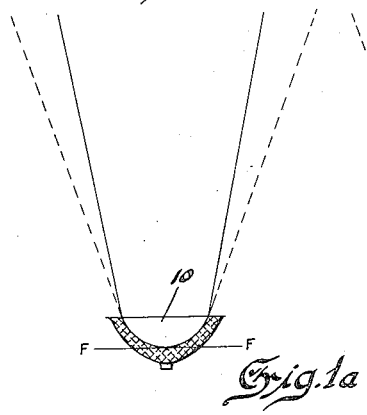
Figure 1a is a top plan view of the reflector shown in Figure 1, indicating in solid lines the horizontal spread of the beam projected by a filament at focus, and in dotted lines the horizontal spread of the beam projected by a filament slightly above focus.
Figure 2A:
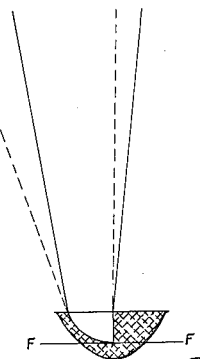
Figure 3A:
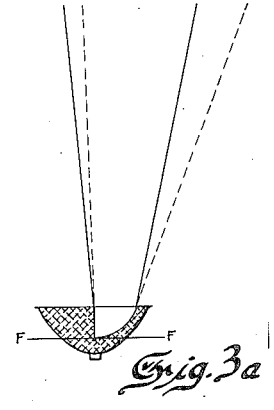
Figure 1:
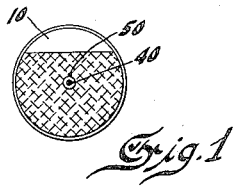
Figure 1 is a rear view of a reflector indicating that all but the top zone is blacked out.

In Figure 1 I have shown a rear view of a conventional parabolic reflector in which all of the reflecting surface except the top zone 10 has been rendered non-reflecting as by blackening or the like. I have indicated the focal filament at 40 and the filament above focus at 50. In Figure 1a I have shown a top view of the reflector of Figure 1, and have indicated in full lines the horizontal spread of the rays projected by the filament on focus, while in dotted lines I have shown the horizontal spread of the rays from the filament approximately 1/8" above focus. In Figure 1b I have shown the beam pattern produced by the section 10 when the filament is on focus, and in Figure 1c I have shown the beam pattern produced by the section 10 when the filament is above focus. It will be noted that the top of the beam is at substantially the same height in both patterns, but that the beam pattern produced by the filament above focus is both deeper and wider.

Figure 3C:
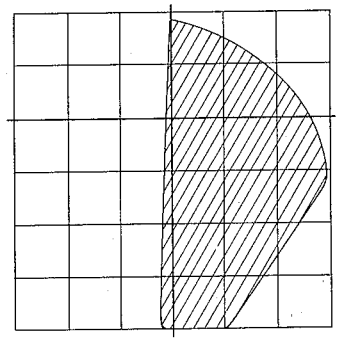
Figure 3B:
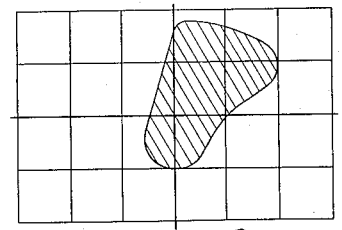
Figure 2:
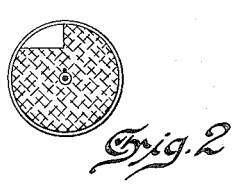
Figure 3:
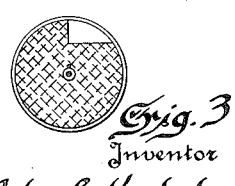
Figure 4C:
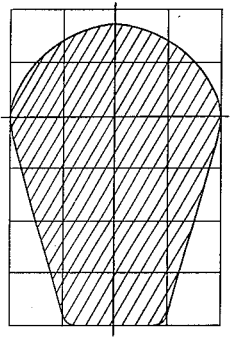

In Figures 2, 2a, 2b, 2c, 3, 3a, 3b, and 3c I have analyzed the optics involved by showing the beam patterns produced by the left and right halves, respectively, of the zone 10, the left half being illustrated in the series of views beginning with Figure 2, while the right half is shown in the series of views beginning with Figure 3. It will be noted that the beam patterns from these sections with the filament above focus are almost wholly on the same side of the vertical reflector axis as the section of the reflector which projects them. This is due to the fact that the filament is closer to these sections than it would be if it were at focus. Thus the beams from the two halves tend to diverge upon going to the upper filament. The effect is similar to that obtained when a filament is moved behind focus in a conventional reflector.

Figure 5C:
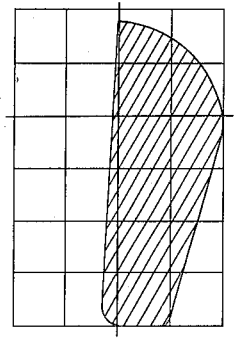
Figure 6C:
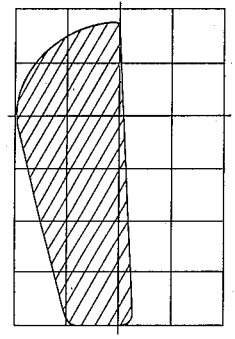
Figure 4B:
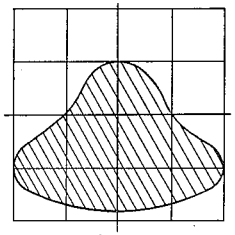
Figure 5B:
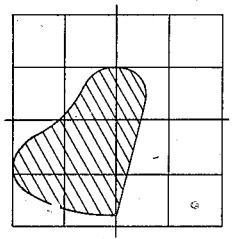
Figure 6B:
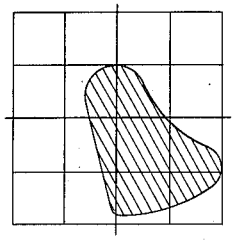
Figure 4A:
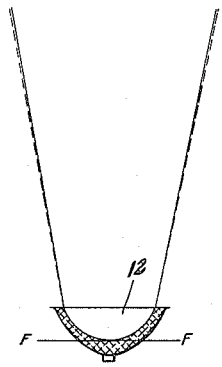
Figure 5A:
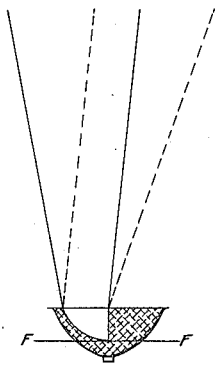
Figure 6A:
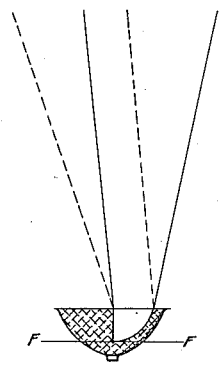
Figure 4:
Figure 5:
Figure 6:
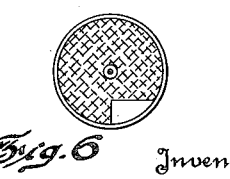

Figures 4, 5, and 6 and the sub-figures thereunder correspond to the series first described. The group beginning with Figure 4 shows the character of the beam projected by the lower zone 12 of the reflector, and the group beginning with Figures 5 and 6 show the beams projected by the left and right halves of the bottom zone of the reflector, respectively. An inspection of Figures 4a, 4b, and 4c will make it clear that the projected beams are of substantially the same horizontal spread, but that the beam projected by the filament above focus rises somewhat higher than that projected by the filament at focus, and is also of much greater depth. A comparison of Figures 5b and 5c will reveal the fact that when the focal filament is energized the left side of the lower zone casts light to the left of the center line, and when the filament above focus is energized, this same side casts light to the right of the center line. A comparison of Figures 6b and 6c will reveal that when the focal filament is energized the right side of the lower zone casts light to the right of the center line, and when the filament above focus is energized, this same side casts light to the left of the center line. Thus in shifting from a filament on focus to a filament above focus the rays projected from the two halves of the bottom zone become criss-crossed. This is due to the fact that the filament above focus is farther away from the bottom zone than the filament at focus, and consequently the beams tend to converge. This result is similar to that obtained when a filament is moved ahead of focus in a conventional reflector.

In all of the beams shown in the figures so far described it will be apparent that some of the light is always projected down the center and some to the opposite side of the center from that of the bulk of the light.

In designing a headlamp to project an asymmetrical beam it is desirable that but little of the light in the uppermost part of the beam shall be thrown to the left of the center line, for this is likely to reach the eyes of the driver of an approaching car, and blind him. Hence at least the bulk of the rays which would normally go to the left of the center line with the filament above focus should be redirected toward the right.

In Figures 7, 8, 9, 10, 11, and 12, I have illustrated an embodiment of my invention in which the plain parabolic reflector 15 is provided with a bulb having a filament 16 on focus, and a filament 18 above focus, and with a lens 20 having formed in it the necessary flutes and prisms to properly distribute the light to give the desired symmetrical and asymmetrical beams. I have shown the lens provided with prisms on its front face, and flutes on its rear face, but this arrangement may be reversed, and if desired, both flutes and prisms may be arranged on the same side of the lens.

Referring to Figure 7 it will be noted that down the center of the lens the lightest prisms are employed over the top and bottom zones. If desired the glass next to the bottom prism may be plain. While the prisms over the center of the lens are the heavier, they are graded in strength, those nearest the center being somewhat lighter. As shown in Figure 12 the prisms over the sides of the central zone are lighter than those over the adjacent portions of the top and bottom zones.

With this arrangement it will be apparent that the light from the top and bottom zones will be directed toward the top of the beam whichever filament is lighted, while the light from the sides of the central zone will be projected to the top of the beam when the focal filament is lighted, and will be dropped down when the filament above focus is lighted. Were this lens now provided with conventional symmetrical flutes there would be no drop in the beam upon going to the upper filament, but merely a shift of light within the beam.

To secure an asymmetrical beam I have given special treatment to the top and bottom zones of the lens. Thus in front of the right hand side of the upper zone I have provided simply plain glass which may be marked to imitate flutes to give the lens a uniform appearance. This treatment is satisfactory for this part of the lens for the reason that as shown in Figures 3b and 3c the light from this part of the reflector is always thrown to the right of the lamp center line. The portion of the lens that overlies the left half of the top zone I have provided with asymmetrical flutes directing the light toward the right side of the road as well as giving it a slight amount of spread.

Over the left half of the bottom zone of the reflector the lens may be devoid of flutes since the corresponding light is shifted toward the right upon going to the upper filament as shown in Figure 5c. However, I have preferred to apply light symmetrical flutes to this part of the lens to secure slight additional spread.

Over the right half of the bottom of the reflector I have provided half flutes as shown which bend the light toward the right a sufficient degree so that upon going to the upper filament the light will not be thrown to the left of the center line.

As shown in Figure 11 the central zone of the lens may be provided with symmetrical flutes of variegated spread to distribute light on both sides of the road.

In Figures 13 to 18 I have shown beam patterns produced by the lamp shown in the preceding figures.

In Figure 13 I have shown the beam projected by the top and bottom zones of the reflector with the filament at focus. The concentrated portion of the pattern at the left is produced by the right hand portion of the top zone which is devoid of flutes.

In figure 14 I have shown the beam pattern produced by the top and bottom zones with the filament above focus. It will be noted that the beam of Figure 14 does not extend as far to the left as the beam of Figure 13.

In Figures 15 and 16 I have shown the beams produced by the central zone with the filament at focus and above focus, respectively. The part of high intensity at the top of the beam is projected from the sides of the central zone of the reflector.

In Figure 17 I have shown the complete beam cast by the focal filament, this beam being formed by superposing the beam of Figure 13 on the beam of Figure 15.

In Figure 18 I have shown the beam projected by one of my headlamps with the filament above focus. It will be noted that this beam is asymmetrical since the light projected from the top and bottom zones remains elevated and to the right of the road. The light from these zones is also better concentrated down the center of the road for the light from the right hand side of the lower zone moves in toward the center of beam as described in connection with Figures 6a and 6b.

If preferred, the half flutes over the left side of the top zone and the right side of the bottom zone may be replaced with simple side bending prisms, or the radius of the flutes may be increased or decreased to the extent desired. If all curvature is eliminated the pattern cast by top and bottom zones with the filament at focus will approximate the concentrated part of the patterns of Figures 13 and 14 and the pattern with the filament above focus will be substantially circular.

In Figures 17 and 18 it will be noted that the symmetrical beam, known as the driving beam, throws more light on the right side of the road, owing to the fact that substantially all of the light from the top and bottom section is thrown to the right of the road, while the light from the central zone is distributed equally on both sides of the road. If this unbalancing of the beam is objectionable it may be avoided by redistributing the light composing the hot spot of the beam projected from the central zone so that it will be spread more to the left than to the right. I have illustrated such a light distribution in Figure 20. This may be accomplished by providing some asymmetrical flutes over the sides of the central zone so as to bend the rays somewhat toward the left. I have illustrated a suitable design of the central zone of the lens for this purpose in Figure 19.

In Figure 21 I have shown the combination of the beam pattern of Figure 20 with the beam pattern of Figure 13, this being the resultant beam produced by the filament at focus where asymmetrical flutes such as shown in Figure 19 are employed over the sides of the central zone.

Referring to the various beam patterns it will be noted that the beam projected from the top and bottom zones is of less depth in the driving beam than in the passing beam. This is an advantage in that more light is provided at the top of the symmetrical driving beam, while in the passing beam the additional depth helps to blend the asymmetrical pattern with the symmetrical pattern from the central zone. This increase in vertical depth of the beam when shifting to the upper filament is mainly due to the fact that the top and bottom sections are of such extent as to include some light to the rear of the focal plane. This is done to secure better blending of the light rays from different parts of the reflector.

My invention is capable of considerable modification. Thus, if desired, the asymmetrical part of the beam may be formed only of light from the top zone or from the bottom zone. The light not used at the top of the beam may be directed in the foreground as in present day design. The top and bottom sections of the lamp may be of such vertical depth or shape as to include some light that has been redirected by the reflector from the rear of the focal plane. This would help blend the asymmetrical part of the passing beam with the main symmetrical passing beam.

Since the rays projected from portions of the reflector immediately adjacent the vertical center line is practically unchanged in direction whichever filament is in use, it may be desirable to provide flutes over these portions to bend the light slightly to the right.

While I have illustrated my invention embodied in a special design of lens, it is clear to those skilled in the art that the same results may be accomplished by properly shaping the reflector. Thus the left side of the top zone of the reflector may be provided with half flutes to accomplish the same purpose as the half flutes on the lens, and the same thing may be done to the right side of the bottom zone of the reflector. Light from the remaining sections may be given the desired spread by providing symmetrical flutes on the reflector as described and claimed in the prior patent of Sumner E. Brown, 1,546,281.

It is also well known that instead of providing down-bending prisms on the lens the same result may be accomplished by tilting the corresponding portions of the reflector as set forth, for example, in the prior patent to Sumner E. Brown, 1,822,839, granted September 8, 1931.

Instead of securing insensitivity by depressing the rays from the center of the central zone below the rays from the sides of the central zone, by the use of prisms, or by tilting the corresponding part of the reflector it is possible to accomplish much the same result by axially offsetting the top and bottom sections of the central zone, locating the filament forward of the focus of the lower half of the central zone and behind the focus of the upper half of the central zone as described and claimed in the prior patent of Clarence A. Michel, 1,594,544, granted August 3, 1926.

I claim:

1. A lens comprising three transverse superimposed zones, i. e., top, bottom and intermediate zones extending from edge to edge thereof, the half of the top zone lying to one side of the vertical center line being provided with means to direct light to the opposite side of center only, while the opposite half is substantially plane, said zones being provided with down-bending prisms, the prisms over the central zone being heavier than those over the other zones.

2. A lens comprising three transverse, superimposed zones, i. e., top, bottom and intermediate zones, extending from edge to edge thereof, the half of the bottom zone lying to one side of the vertical center line being provided with means to direct light to the same side of the center line only, while the opposite half is provided with means to distribute light symmetrically, said zones being provided with down-bending prisms, the prisms over the central zone being heavier than those over the other zones.

3. A lens comprising three transverse superimposed zones extending from edge to edge thereof, one side of the top zone and the diagonally opposite side of the bottom zone being provided with means to direct light to the same side of the vertical center line only, the remaining portions of said lens being provided with means for directing light substantially straight ahead.

4. A lens comprising three transverse superimposed zones extending from edge to edge thereof, said lens being provided with down-bending prisms, the prisms over the center of the central zone being heavier than those over the remainder of the lens, one side of the top zone and the diagonally opposite side of the bottom zone being provided with means to direct light to the same side of the vertical center line only while the remaining portions of said zones are provided with means for directing light substantially straight ahead.

5. A lens comprising three transverse, superimposed zones extending from edge to edge thereof, said lens being provided with down-bending prisms, the prisms over the center of the intermediate zone being heavier than those over the remainder of the lens, one side of the top zone and the diagonally opposite side of the bottom zone being provided with means to direct light to one side of the center line only, while the opposite sides thereof are provided with means to symmetrically distribute light.

6. A lens comprising three transverse, superimposed zones extending from edge to edge thereof, said lens being provided with down-bending prisms, the prisms over the center of the intermediate zone being heavier than those over the remainder of the lens, one side of the top zone and the diagonally opposite side of the bottom zone being provided with means to direct light to one side of the center line only, while the opposite sides thereof are provided with means to symmetrically distribute light, the central zone being provided with means for spreading light equally on opposite sides of the center line.

7. A headlamp adapted to be mounted at the front of a vehicle to light the roadway, comprising light projecting means including a concave light concentrating reflector and a glass closure, means providing a source of light at a point adjacent the focus of the reflector or at a point above the focus, said light projecting means being divided into upper, intermediate and lower transversely extending superimposed zones, the rays of light from said upper and lower zones being but slightly affected by shifting from one source to the other while the rays of light from said intermediate zone are shifted sharply downwardly upon energizing the upper source, said intermediate zone being provided with means to spread the light falling upon it on both sides of the road, said upper and lower zones being provided with means to direct the rays falling upon them toward one side only of the road when the upper source is energized, whereby, upon changing to the upper source, the remainder of the beam is lowered, producing an asymmetrical beam higher on one side than on the other.

8. A headlamp adapted to be mounted at the front of a vehicle to light the roadway, comprising light projecting means including a concave light concentrating reflector and a glass closure, means providing a source of light at a point adjacent the focus of the reflector or at a point above the focus, said light projecting means being divided into upper, intermediate and lower transversely extending superimposed zones, the rays of light from said upper and lower zones being but slightly affected by shifting from one source to the other while the rays of light from said intermediate zone are shifted sharply downwardly upon energizing the upper source, the left half of the upper zone and the right half of the lower zone being provided with means to direct rays falling upon them toward the right side of the road only, while the remaining portions of said zones are provided with means to project rays from the focal source straight ahead, whereby, upon changing to the upper source, the remainder of the beam is lowered producing an asymmetrical beam higher on one side than on the other.

9. A headlamp comprising light projecting means including a concave light-concentrating reflector and a glass closure, means providing a source of light at a point slightly above the focus, said light projecting means including a lower zone extending from side to side of the reflector, the right side of said lower zone which would normally direct light into the left hand portion of the beam pattern being provided with means to direct the rays falling upon it towards the right side of the road only, while the other side of said zone is provided with means to project the rays falling upon it substantially straight ahead, thereby producing a concentration of light in the right hand portion of the beam.

10. A lens comprising three transverse, superimposed zones extending from edge to edge thereof, said lens being provided with downbending prisms, the prisms over the center of the central zone being heavier than those over the remainder of the lens, said top and bottom zones being provided with means to direct light to the same side of the vertical center line only, and said central zone being provided with means to direct light on both sides of said vertical center line.

11. A lens having a substantial area of an upper quadrant and a substantial area of the diagonally opposite lower quadrant provided with means for directing substantially all the light passing therethrough to the same side only of the vertical diameter, substantially all of the remaining area of the lens being provided with means for directing light symmetrically.

12. A headlamp adapted to be mounted at the front of a vehicle to light the roadway comprising light projecting means including a concave light concentrating reflector and a glass closure, means providing a source of light adjacent the focus of the reflector or at a point above the focus, said light projecting means having a substantial portion of an upper quadrant and a substantial portion of the diagonally opposite lower quadrant provided with means for directing substantially all of the light projecting thereby to the same side only of the vertical diameter, substantially all of the remaining portion of the light projecting means being provided with means for directing light symmetrically, whereby, upon shifting to the upper source, an asymmetrical beam is obtained.

13. A headlamp adapted to be mounted at the front of a vehicle to light the roadway comprising light projecting means including a concave light concentrating reflector and a glass closure, means providing a source of light at a point adjacent the focus of the reflector or at a point above the focus, said light projecting means being divided into upper, intermediate and lower transversely extending superimposed zones, the rays of light from said upper and lower zones being but slightly affected in vertical aim by shifting from one source to the other while the rays of light from said intermediate zone are shifted downwardly upon energizing the upper source, said intermediate zone being provided with means to spread light on both sides of the road, a substantial portion of one of said zones other than the intermediate zone being provided with means to direct the rays falling upon it toward the more distant portions of the right side only of the road when the upper source is energized, substantially all of the remainder of the upper and lower zones being provided with means for directing light away from the more distant portions of the left side of the road when the upper filament is energized, whereby, upon changing to the upper source, the rays from the intermediate zone are shifted downwardly, producing an asymmetrical beam higher on one side than on the other.

14. A headlamp adapted to be mounted at the front of a vehicle to light the roadway comprising light projecting means including a concave light concentrating reflector and a glass closure, means providing a source of light at a point adjacent the focus of the reflector or at a point above the focus, said light projecting means being divided into upper, intermediate and lower transversely extending superimposed zones, the rays of light from said upper and lower zones being but slightly affected in vertical aim by shifting from one source to the other while the rays of light from said intermediate zone are shifted downwardly upon energizing the upper source, said intermediate zone being provided with means to spread light on both sides of the road, substantial portions of said upper and lower zones being provided with means to direct the rays falling upon them toward the more distant portions of the right side only of the road when the upper source is energized, substantially all of the remainder of the upper and lower zones being provided with means for directing light away from the more distant portions of the left side of the road when the upper filament is energized, whereby, upon changing to the upper source, the rays from the intermediate zone are shifted downwardly producing an asymmetrical beam higher on one side than on the other.

15. A headlamp adapted to be mounted at the front of a vehicle to light the roadway comprising light projecting means including a concave light concentrating reflector and a glass closure, means providing a source of light at a point adjacent the focus of the reflector or at a point above the focus, said light projecting means being divided into upper, intermediate and lower transversely extending superimposed zones, the rays of light from said upper and lower zones being but slightly affected by shifting from one source to the other while the rays of light from said intermediate zone are shifted downwardly upon energizing the upper source, a substantial portion of the upper zone lying to one side of the vertical diameter and a substantial portion of the lower zone lying on the other side of the vertical diameter being provided with means for directing substantially all of the light projected thereby toward the more distant portions of the right side of the road, substantially all of the remainder of the upper and lower zones being provided with means for directing light away from the more distant portions of the left side of the road, the intermediate zone being provided with means for spreading light on both sides of the road, whereby, when the upper filament is energized, the rays from the intermediate zone are shifted downwardly producing an asymmetrical beam higher on the right side than on the left.

JOHN L. KOUBEK.